Dec. 9, 1969   L. L. PREM ET AL   3,483,405
ALTERNATING CURRENT MAGNETOHYDRODYNAMIC GENERATOR
Filed Sept. 29, 1966
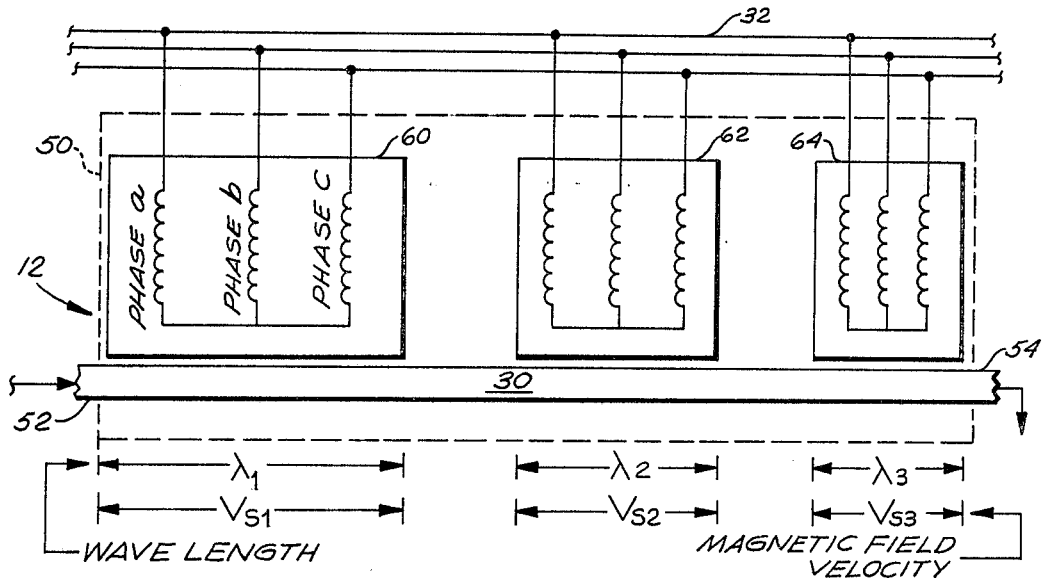
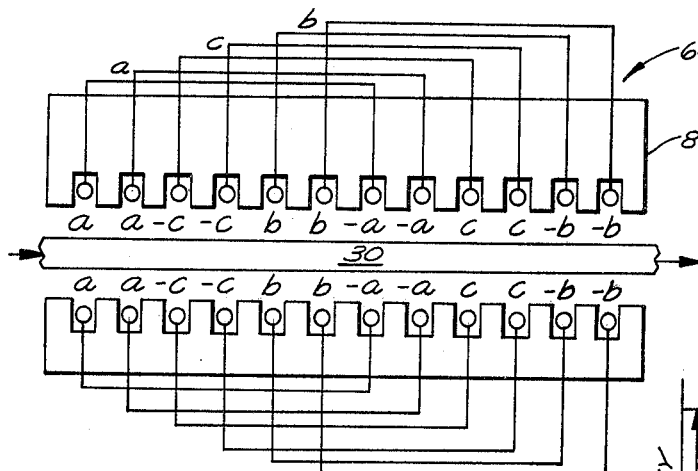
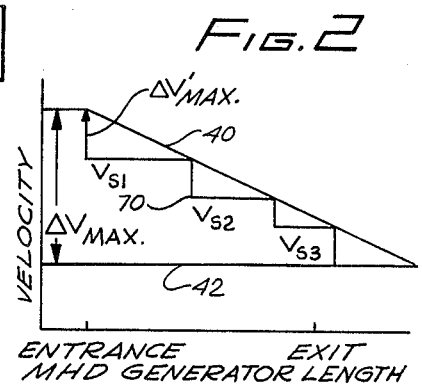
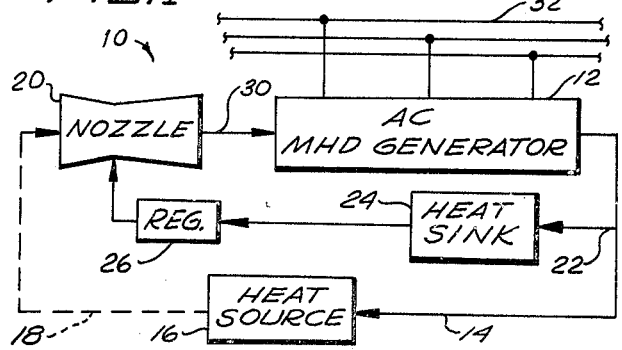
INVENTORS.
LAWRENCE L. PREM
TSIH-CHANG WANG
BY
Donald J. Ellingsberg

3,483,405
ALTERNATING CURRENT MAGNETOHYDRODYNAMIC GENERATOR

Lawrence L. Prem, Tarzana, and Tsih-Chang Wang, Santa Monica, Calif., assignors to North American Rockwell Corporation.
Filed Sept. 29, 1966, Ser. No. 582,878
Int. Cl. H02k 45/00; G21d 7/02
U.S. Cl. 310—11                                             2 Claims

ABSTRACT OF THE DISCLOSURE

An improved alternating current magnetohydrodynamic (MHD) generator having successively arranged magnetic pole pairs between the entrance and exit regions of a generator region where each of the successive magnetic pole pairs has a predetermined wave length that is less than the wave length of the preceding magnetic pole pair so that the velocity of the resulting travelling magnetic field matches the decreasing velocity of a working fluid passing through the MHD generator.

BACKGROUND OF THE INVENTION

Conventional MHD generators generate direct electrical current by converting the kinetic energy of an electrically conductive working fluid into electrical energy by moving the working fluid through a primary or applied magnetic field that is set up across the MHD generator. The interaction of the moving fluid and the primary magnetic field induces an electrical field with a direct current flow in a direction that is mutually perpendicular to both the direction of fluid motion and the magnetic field. The direct current flow is collected by suitable electrodes spaced apart within the MHD generator which are electrically connected to an external load in a conventional manner.

There are several disadvantages in the conventional direct current MHD generators. Direct current, with the exception of a few industrial applications is not useful for most commercial and industrial applications where the desirable form of electrical energy is alternating electrical current. Direct current MHD generators, therefore, need inverter equipment to convert the direct current to alternating current. However, inverter equipment in complex and expensive, and therefore the cost per kilowatt hour is substantially increased. Additionally, inverter equipment introduces an unwanted power loss during the conversion from direct to alternating current.

Another disadvantage in a direct current MHD generator is that the electrical current is collected by electrodes that are physically positioned within the MHD generator and exposed to the working fluid passing through the generator. This direct contact with the working fluid presents a severe materials problem since the working fluid rapidly erodes the electrodes. Frequent replacement of the electrodes is therefore necessary. In addition, the positive electrode must be at an operating temperature where it will be a good electron emitter. However, the electrodes cannot be conveniently cooled in a direct current MHD generator because a low temperature region near the electrodes introduces a high electrical resistivity with a corresponding high power loss.

The disadvantages with direct current MHD power generation led to the development of MHD generators that generate alternating current and thereby eliminate inverter equipment. The alternating current MHD generators known in the prior art also eliminate electrodes by using inductive coupling. The principle of operation of these alternating current or induction MHD generators is essentially that of well-known rotating induction machinery. In alternating current MHD generators, the primary magnetic field of a direct current MHD generator is replaced with a set of field windings that are sequentially energized to set up a magnetic field that moves as a travelling wave in the direction of the working fluid flow through the generator. The travelling magnetic wave that is set up by the sequentially energized field windings develops circulating electrical currents in the moving working fluid. The interaction of these circulating currents with the stator windings through inductive coupling converts the mechanical energy of the working fluid into electrical energy when the velocity of the working fluid is greater than that of the travelling magnetic field. This difference between the working fluid velocity and the velocity of the travelling magnetic wave is known as slip. The slip should be constant and preferably small for the efficient generation of power.

Alternating current MHD generators can generally be classed as plasma or liquid metal generators. These MHD generators can be further classified as constant fluid velocity generators where the pressure of the working fluid is converted to electrical energy, or constant pressure generators where the kinetic energy of the working fluid is converted to electrical energy. While it is generally assumed that the working fluid velocity through a plasma MHD generator is constant, this is not a valid assumption for a liquid metal MHD generator. In actual practice, the working fluid velocity decreases as the fluid passes through the MHD generator. When the externally developed travelling magnetic field moves at a constant speed, the known MHD generators of the prior art experience a variable slip from the entrance region of the MHD generator to the exit region. Therefore, it is desirable to develop a travelling magnetic field that moves at a variable speed from entrance region to exit region so that the slip variation from the entrance to the exit is substantially reduced and becomes more nearly constant.

OBJECTS OF THE INVENTION

Accordingly, it is an object of the invention to provide a new and improved alternating current MHD generator.

It is also an object of the invention to provide a new and improved alternating current MHD generator having an improved stator region.

Another object of the invention is to provide an alternating current MHD generator having an improved stator region to set up a travelling magnetic field having a variable magnetic field velocity.

A further object of the invention is to provide an alternating current MHD generator that generates electrical power at increased efficiency.

Yet another object of the invention is to provide an alternating current MHD generator that has a substantially constant electrical power output per channel unit volume.

It is another object of the invention to provide an alternating current MHD generator that has substantially constant efficiency throughout the channel length.

SUMMARY OF THE INVENTION

Briefly, in accordance with one form the invention, a new and improved alternating current magnetohydrodynamic generator is provided having a stator region with at least first and second magnetic pole pairs successively arranged between the entrance and exit regions of a generator region. Each of the successive magnetic pole pairs after the first magnetic pole pair has an effective and predetermined wave length that is less than the wave length of the preceding magnetic pole pair so that the velocity of the travelling magnetic field developed by the stator decreases from the entrance region to the exit region of the generator. The decreasing velocity of the travelling magnetic field matches the decreasing velocity of a working fluid passing through the generator so that the slip speed variation from the entrance to the exit is substantially reduced and becomes more nearly constant resulting in the efficient generation of electrical power by the MHD generator.

Further objects, features, and the attending advantages of the invention will become apparent when the following description is read in view of the accompanying drawings.

BRIEF DESCRIPTION OF THE DRAWING

FIGURE 1 is a schematic of an alternating current MHD generator system;

FIGURE 2 is a graph of both the variable slip developed by known prior art forms of alternating current MHD generators and the substantially constant slip developed by one form of alternating current MHD generator formed in accordance with the invention;

FIGURE 3 is a schematic of one form of new and improved alternating current MHD generator of the invention; and FIGURE 4 is an enlarged schematic of a portion of the alternating current MHD generator of FIGURE 3.

DESCRIPTION OF THE INVENTION

Referring to FIGURE 1, an example of one form of alternating current MHD generator system 10 in which the new and improved alternating current MHD generator 12 of the invention can find use has a conduit 14 that introduces an electrically conductive working fluid containing one or more components, at least one of which is vaporizable, into a suitable and conventional heat source 16. The working fluid is raised to a temperature equal to or higher than the vaporization temperature thereof by the heat source 16 so that the working fluid is partially vaporized and in the system 10 as shown becomes a two-phase mixture, i.e., having both vapor and liquid phases. The vapor phase of the conductive fluid, shown by dashed line 18, passes to a nozzle means 20 which increases the kinetic energy of the working fluid. The vapor phase entering the nozzle 20 can be either wet, saturated, or superheated. The nozzle 20 converts the energy of the partially vaporized working fluid into kinetic energy so that a high velocity, working fluid stream results.

In the alternating current MHD generator system 10 as shown by FIGURE 1, a liquid portion of the working fluid passing through conduit 14 to the heat source 16 is fed through conduit 22 to a conventional heat sink 24 which subcools the liquid. A separate source of liquid is also contemplated. The subcooled liquid is conducted through a pressure or flow regulator 26 and injected into the nozzle 20 so that the kinetic energy of the driving stream is transferred to the subcooled liquid. The pressure or flow regulator 26 controls the conditions for the injection of the subcooled liquid into the vapor stream in nozzle 20. The resulting fluid, which initially contains both liquid and vapor phases of the working liquid, is in a form that can generally be described as a fog. A free exchange of thermal energy occurs between the two phases when they are maintained in this condition for a sufficient time. This insures that the greater or entire portion of the vapor is condensed by the mass heat transfer with the subcooled liquid and also that the kinetic energy of the vapor is transferred to the subcooled liquid. The resulting working fluid passing from nozzle 20 through conduit or channel 30 to the alternating current MHD generator 12 of the invention consists essentially of the liquid phase and is, therefore, an electrically conductive fluid. The electrically conductive working fluid passes through the alternating current MHD generator 12 where the kinetic energy of the working fluid stream is converted to electrical energy. The electrical energy that is generated by the alternating current MHD generator 12 is fed to a conventional polyphase bus bar such as the three-phase bus bar 32.

Although FIGURE 1 shows a closed fluid cycle, it is contemplated that the alternating current MHD generator system 10 can also cooperate with an open cycle system in a conventional manner. It is also contemplated that the alternating current MHD generator of the invention can find use with other magnetohydrodynamic generator systems than that illustrated by FIGURE 1.

Referring to FIGURE 2, there is a proportional decrease in working fluid velocity from the entrance to the exit regions of an alternating current MHD generator as illustrated, for example, by the linear working fluid velocity curve 40. It is contemplated that programmed working curves other than a linear curve can also be used. Prior art forms of MHD generators set up a constant velocity travelling magnetic wave 42 by the energization of suitable stator windings in the MHD generator. The difference between the working fluid velocity as illustrated by curve 40 and the travelling magnetic field velocity as illustrated by curve 42 is large at the entrance region to the MHD generator region and this difference is designated as $\Delta V_{MAX}$. $\Delta V_{MAX}$ can be considered as representing a maximum slip. However, the velocity of the working fluid decreases—illustrated by FIGURE 2 as a linear decrease whereas it can be other than linear—so that the velocity of the working fluid 40 at the exit region of the MHD generator is substantially equal to the velocity of the travelling magnetic wave 42 at the exit region. The $\Delta V_{MAX}$, therefore, has approached, or is at, zero. Consequently, a variable slip rather than a constant slip is developed by prior art MHD generators between the entrance and exit regions. As previously indicated, this substantially decreases the efficiency of the MHD generator for electrical power generation.

Referring now to FIGURE 3, the improved alternating current MHD generator 12 of FIGURE 1 is shown having one form of an improved stator region 50 formed in accordance with the invention. Conduit or channel 30 passes the electrically conductive working fluid through the generator 12 perpendicular to a plane defined by the stator region 50 and perpendicular to a primary magnetic field that is set up generally across the stator region by a conventional magnetic means such as magnetic poles (not shown) that are spaced apart by the conduit and positioned generally normal to the plane of the drawing. The fluid flow, the stator region, and the primary magnetic field, therefore, are mutually perpendicular in accordance with conventional MHD generator principles. The stator region 50, and the magnetic means also, generally defines an entrance region 52 and an exit region 54 in the MHD generator 12.

The improved stator region 50 of the MHD generator 12 as shown by FIGURE 3 has separate magnetic pole pair generator sections 60, 62, 64 that are connected to the polyphase bus bar 32. It is contemplated that the successive generator sections 60, 62, 64, which are illustrated as separate magnetic circuits positioned on separate stator cores, can also be positioned on a single stator core. It is also contemplated that the improved stator region of the alternating current MHD generator can have other than the three generator sections as shown, and that part of a generator section can be used when a fractional part of a wavelength is desired. In the form shown by FIGURE 3, each of the generator sections 60, 62, 64 has a three-phase stator winding connected to the polyphase bus bar 32 which again is shown as a preferred and conventional three-phase bus bar.

The successive generator sections 60, 62, 64 are suitably wound in a conventional manner to have differing wavelengths and corresponding magnetic field velocities which cascade, in the form shown by FIGURE 3, in predetermined steps from a high magnetic field velocity beginning at the entrance region 52 to a lower magnetic field velocity at the exit region 54. Thus, generator sections 60, 62, 64 develop decreasing wavelengths proceeding from the entrance region 52 to the exit region 54 of the alternating current MHD generator 12. For example, generator section 60 has a wavelength $\lambda_1$; section 62 has a wavelength $\lambda_2$; and section 64 has a wavelength $\lambda_3$. In accordance with the invention, $\lambda_1$ is greater than $\lambda_2$, and $\lambda_2$ is greater than $\lambda_3$. This develops a stepped magnetic velocity curve, such as stepped curve 70 as shown by FIGURE 2. The magnetic field velocity corresponding to wavelength $\lambda_1$ is designated $V_{S1}$; $\lambda_2$ corresponds to $V_{S2}$; and, $\lambda_3$ corresponds to $V_{S3}$. Thus, magnetic field velocity $V_{S1}$ is greater than $V_{S2}$ which is also greater than $V_{S3}$. The improved alternating current MHD generator 12, therefore, develops successive wavelengths that have decreasing magnetic field velocities so that the synchronous velocity of a resulting travelling magnetic wave decreases in a series of steps through the channel 30. This results in a uniform power density and a substantially constant pressure in the working fluid throughout the length of the stator region 50 from the entrance region 52 to the exit region 54 of the improved alternating current MHD generator 12.

Each step of the magnetic velocity curve 70 as shown by FIGURE 2 that is developed by the improved alternating current MHD generator 12 of our invention has a maximum $\Delta V'_{MAX}$ between each of the steps of the magnetic velocity curve 70 and the working fluid velocity curve 40. It can be seen that the $\Delta V'_{MAX}$ developed by the invention for each step is substantially less than the $\Delta V_{MAX}$ that is developed by prior art MHD generators between the working fluid velocity curve 40 and the constant travelling magnetic wave velocity curve 42. Therefore, the electrical efficiency of the improved alternating current MHD generator 12 of the invention is substantially improved and an essentially constant power density through the conduit or channel 30 is achieved by our invention.

FIGURE 4 schematically shows an enlarged view of generator section 60 of FIGURE 3. Generator section 60 has a conventional separate stator core 80 on which a polyphase winding is positioned. This has been described hereinbefore and is illustrated by FIGURE 4 as a three-phase winding having phases $a$, $b$, and $c$. In a similar fashion, successive generator sections 62 and 64 are suitably wound with polyphase windings on separate stator cores so that the decreasing stepped magnetic field velocities $V_{S1}$, $V_{S2}$, and $V_{S3}$ are developed as described hereinbefore. It is contemplated that the windings for generator sections 60, 62, and 64 can be other than three-phase, and can be wound on a single stator core rather than on separate stator cores as illustrated, particularly as illustrated by FIGURE 3.

As will be evidenced from the foregoing description, certain aspects of the invention are not limited to the particular details of construction as illustrated, and it is contemplated that other modifications and applications other than those described herein will occur to those skilled in the art. Accordingly, it is intended that the appended claims shall cover such modifications and applications that do not depart from the true spirit and scope of the invention.

We claim:
1. In an alternating current magnetohydrodynamic generator wherein a conduit in fluid communication with a source of electrically conductive working fluid passes the working fluid through a generator region, the combination with said generator region of an improved stator region comprising:
   (a) at least first and second stator core members cooperating with the conduit,
   (b) at least first and second generator sections cooperating with respective ones of said first and second stator core members and successively arranged generally from the entrance region to the exit region,
   (c) a stator winding cooperating with each of said generator sections, and
   (d) a source of electrical energy connected to each of said stator windings,
   (e) each of said successive stator windings developing a predetermined wavelength that is less than the wavelength of the preceding stator winding so that the magnetic field velocity of a travelling magnetic field developed by said successive stator windings decreases in a predetermined pattern from the entrance region to the exit region.

2. The improved stator region of claim 1 in which said stator winding is polyphase and said source of electrical energy is polyphase.

References Cited

FOREIGN PATENTS 1,052,548   3/1959   Germany.

DAVID X. SLINEY, Primary Examiner